(12) United States Patent
Huynh et al.

(10) Patent No.: US 6,240,184 B1
(45) Date of Patent: May 29, 2001

(54) PASSWORD SYNCHRONIZATION

(75) Inventors: Dung Huynh, San Jose; Matthew Robshaw, San Francisco, both of CA (US); Ari Juels, Cambridge; Burton Kaliski, Jr., Wellesley, both of MA (US)

(73) Assignee: RSA Security Inc., Bedford, MA (US)

( * ) Notice: Subject to any disclaimer, the term of this patent is extended or adjusted under 35 U.S.C. 154(b) by 0 days.

(21) Appl. No.: 09/145,845

(22) Filed: Sep. 2, 1998

Related U.S. Application Data

(60) Provisional application No. 60/058,070, filed on Sep. 5, 1997.

(51) Int. Cl.⁷ .................................................. G06F 12/14
(52) U.S. Cl. ......................... 380/206; 380/268; 380/274; 380/142; 380/184; 380/182
(58) Field of Search ........................... 380/206, 268, 380/274, 142, 184, 182

(56) References Cited

U.S. PATENT DOCUMENTS

| | | | |
|---|---|---|---|
| 4,817,146 | * 3/1989 | Szczutkowski et al. | 380/48 |
| 5,719,941 | 2/1998 | Swift et al. | 380/25 |
| 5,734,718 | 3/1998 | Prafullchandra | 380/4 |
| 5,832,211 | 11/1998 | Blakley, III et al. | 395/188.01 |
| 5,838,903 | 11/1998 | Blakely, III et al. | 395/188.01 |

FOREIGN PATENT DOCUMENTS

| | | | |
|---|---|---|---|
| 0 752 636 A2 | 1/1997 | (EP) | G06F/1/00 |
| 0 773489 A1 | 5/1997 | (EP) | G06F/1/00 |
| 09330298 | 12/1997 | (JP) | G06F/15/00 |

OTHER PUBLICATIONS

Gish, J. ""Salting" the Password," *Infosystems*, vol. 32, No. 4, Apr. 1985, abstract only, 1 pg.

Wu, et al. "Authenticating Passwords Over an Insecure Channel," *Computer & Security*, vol. 15, No. 5, 1996, pp. 431–439.

Patent Cooperation Treaty, International Search Report, International Application No. PCT/US 98/18326, mailed on Jan. 11, 1999, 4 pages.

* cited by examiner

*Primary Examiner*—Thomas R. Peeso
*Assistant Examiner*—Todd Jack
(74) *Attorney, Agent, or Firm*—Testa, Hurwitz & Thibeault, LLP

(57) ABSTRACT

A system, method, and data structure provide for securely synchronizing passwords and/or other information between systems. The password-related information is stored in the systems in a secure manner, and a user or some other, external agent participates actively in the transmission of a new password between systems. A password update file is communicated or shared between systems to synchronize passwords.

36 Claims, 8 Drawing Sheets

PASSWORD SYNCHRONIZATION

PASSWORD SYNCHRONIZATION

This application claims priority to U.S. provisional patent application serial No. 60/058,070, filed Sep. 5, 1997.

TECHNICAL FIELD

This invention relates to computer data security and, more particularly, to synchronizing passwords stored in systems that communicate via an unsecure channel.

BACKGROUND INFORMATION

In the context of computer data security, user authentication is the process of a computer system reliably verifying the identity of a user. Password-based user authentication refers to a secret quantity (the "password") that the user communicates to the system to prove that she knows it. Computer systems sometimes store passwords in a data store that is not secure, and so there is a risk that the passwords might be read by an attacker. The password can be stored in a manner that allows a secret password to be verified easily, but does not leave the secret password exposed. For example, the hash of a password, rather than the password itself, can be stored in the system. When a user submits a "claimed" password, a submission that requires verification to determine if it is, in fact, the actual password, the claimed password is hashed, meaning that a one-way, not easily reversible, function is performed using the password as an input such that the result of the function is relatively unique to the password, and does not provide enough information to recover the password. The hash of the claimed password is compared to the stored hash of the actual password. If the hash of the claimed password is identical to the hash of the actual password, then the user is authenticated. An attacker who gains access to the hash of the password cannot readily discern the password from the hash of the password due to the one-way property of the hash function.

When a system is designed such that the same user would benefit from authentication on multiple systems, it becomes necessary for the user to maintain passwords on each system. It can be unwieldy for a user to remember different passwords for multiple systems, and a user generally prefers to have the same password on all systems. When a user changes her password on one system, the user generally prefers to have the password automatically changed, also referred to as synchronized, on other systems. This can be accomplished by propagating a password from a first system, system A, to a second system, system B.

Depending on the systems, and the links between them, the communications channel between systems A and B may not be secure. In addition, it may be necessary to verify that the password propagated from system A to system B actually comes from system A, and not from an attacker.

SUMMARY OF THE INVENTION

Thus, a system and method to synchronize passwords that does not require use of public key cryptography and its associated overhead is therefore useful and desired. The present invention provides such a system.

In general, in one aspect, the invention features a data structure facilitating use of a password. The data structure is stored in a memory element. The data structure has a first portion storing a value encrypted with an encryption key based on the password. The data structure also has a second portion storing a digest created in response to an input comprising the value.

In general, in another aspect, the invention features a method for creating a password file. The method includes the step of encrypting a value using an encryption key based on an updated password. A digest is created in response to the encrypted value; and the value and the digest are stored in a memory. The digest is the result of treating a message as a string of bits, and applying a one-way transformation to produce a fixed-length value. In one embodiment, the one-way transformation is a hash function.

In general, in another aspect, the invention features a method for changing a password. The method includes accepting a first password and decrypting information in a file that was encrypted with the first password. The decrypted information is verified. The method further includes accepting a second password, and encrypting information in the file with the second password.

In general, in another aspect, the invention features a system for changing a password. The system includes a first receiver for receiving a first password. The system includes a decrypting module for decrypting information in a file that was encrypted with the first password. The system includes a verification module for verifying the decrypted information, and a second receiver for receiving a second password. The system includes an encrypting module for encrypting information in the file with the second password.

In general, in another aspect, the invention features a system for updating data in a password verification memory. The system includes a password update file, a receiver for receiving a password, and a decryption module for decrypting information in the password update file. The system further includes a verification module for verifying the received password by comparing the decrypted information to the data in the password verification memory, and an output for replacing at least some of the data in the password verification memory in response to the received password.

In general, in another aspect, the invention features a method for updating a password. The method includes receiving password data, decrypting a value using a decryption key based on the password data, and producing a first function result in response to the decrypted value. The method further includes comparing the first function result with a value in a memory to verify the password data, producing a second function result in response to the password data, and storing the second function result in the memory.

In general, in another aspect, the invention features a password update system that includes a receiver for receiving a password, a decryption module for decrypting a value using a decryption key based on the password, and a first hashing module for hashing the decrypted value. The system further includes a verifier for comparing the hash of the decrypted value with a value in a memory to verify the password and a second hashing module for hashing the password and storing the result in the memory.

In general, in another aspect, the invention features a method for updating data in a password verification memory location. The method includes receiving a password, decrypting information in a password update file using the received password, and verifying the received password by comparing the decrypted information to the data in the password verification memory location. The method further includes replacing at least some of the data in the password verification memory location in response to the received password.

In general, in another aspect, the invention features a system for updating data. The system includes a password verification memory location, a password update file, and a receiver for receiving a password. The system further includes a decryption module for decrypting information in the password update file using the received password, a verifier for verifying the received password by comparing the decrypted information to the data in the password verification memory location; and an output for replacing at least some of the data in the password verification memory location in response to the received password.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

A system and method are provided for securely synchronizing passwords and/or other information between or among systems, even if it is possible for an unauthorized individual, also referred to as an "attacker," to read all information stored in the systems. The password-related information is stored in the systems in a secure manner, and an external agent, such as a user, participates actively in the transmission of a new password between systems. In particular, the secret used to transmit the password is held by the user or other agent, and it is not stored on any system other than in an encrypted, hashed or other obfuscated form.

Figure 1:
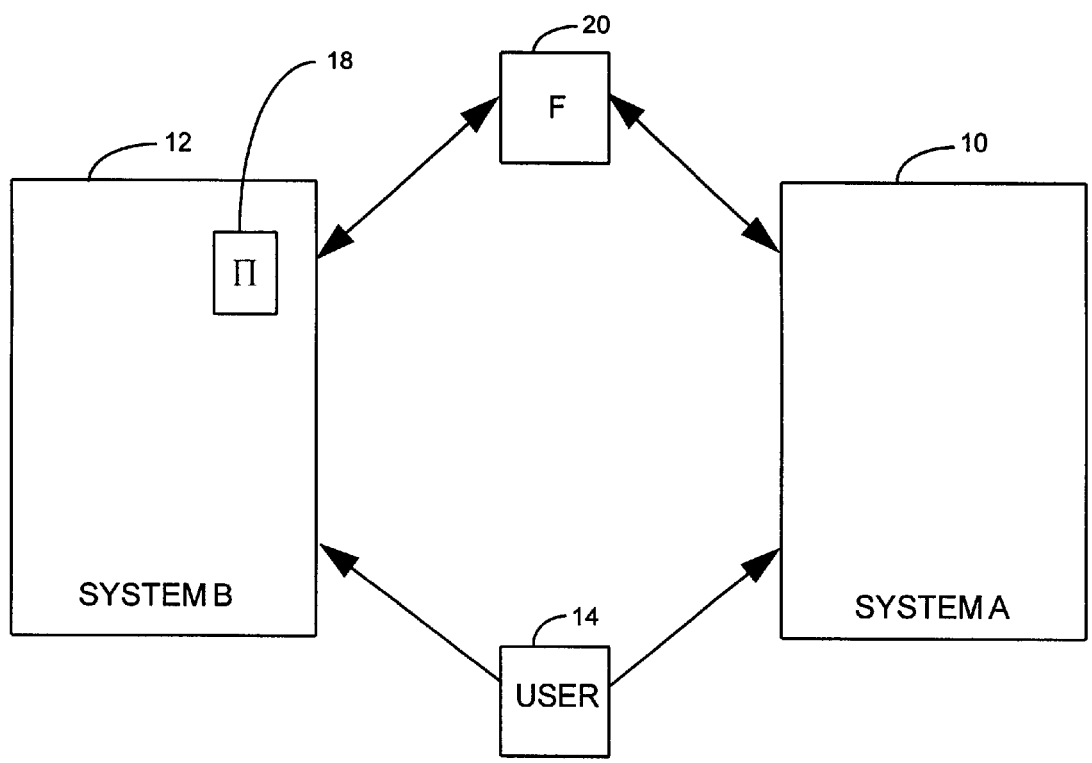
FIG. 1 is a block diagram of two systems according to an embodiment of the invention.

Referring to the embodiment depicted in FIG. 1, a password is synchronized between two systems, system A 10 and system B 12. In one embodiment, systems A 10 and B 12 are commercially available computer systems that include software running on computer hardware. The implementation of the computer systems is not a limitation of the scope of the invention. For example, in one embodiment, system A 10 and system B 12 are separate computer systems. In another embodiment, system A 10 and system B 12 are different modules in the same computer system.

If the system is initially synchronized, the User, or other agent, 14 has the same password, denoted as $P_i$, on System A 10 and System B 12. For simplicity, the User or other agent 14 is referred to as the User. The User includes, but is not limited to, a person or other living being, a corporation, a system, a machine, a computer, or agent that provides a password one of the various possible ways in response to an express or implicit authentication request.

When the User 14 changes her password on System A 10 to a new password, denoted as $P_{i+1}$, then System A 10 will recognize the new password $P_{i+1}$, for the User while System B 12 will continue to recognize password $P_i$. For the systems to be synchronized, the new password $P_{i+1}$ is propagated from system A 10 to system B 12, and system B 12 then recognizes the new password $P_{i+1}$.

As shown in FIG. 1, System B 12 has a data store Π 18. The data store Π 18 is used to store the password. In one embodiment, Π 18 stores information related to the password. For example, in one embodiment, the data store Π 18 contains the hash of a password. The data store Π 18 can be implemented using any appropriate data storage device. In one embodiment, the data store Π 18 is one or more memory locations in non-volatile random access memory. Examples of other embodiments of data store Π 18 include, but are not limited to, data storage locations in a random access memory device, on a hard disk, on a tape drive, or on a read/write optical disk.

In one embodiment, the contents of data store Π are the output of a function, referred to in this description as function $f$, denoted $Π=f(S_i)$. This function $f$ takes sensitive data items $S_i$ as input arguments. The sensitive data items $S_i$ may include one or more sensitive data items $s_i^n$, such that $S_i=\{S_i^1, S_i^2, \ldots S_i^n\}$ where n is the number of sensitive data items and $n \geq 0$. For example, a password $P_i$ may be one of the sensitive data items $S_i$. As another example, a function of $P_i$ may be one of the sensitive data items $S_i$. Demonstration of knowledge of some subset of the sensitive data items $S_i$ can be used to demonstrate knowledge of $P_i$ and thus to authorize password changes. In another embodiment, it is desired to store other data in Π that may or may not be sensitive, and that may or may not be involved in the password synchronization process. Such other data is denoted as $t_i$ so that the contents of Π are a function of sensitive data times $S_i$ and other items $t_i$, denoted $Π=f(S_i,t_i)$.

The function $f$ may take any one of a number of forms. In one embodiment, function $f$ creates a digest based on its input arguments, so that Π contains the digest of the sensitive data items $S_i$. A digest is the result of treating a message as a string of bits, and applying a one-way transformation to produce a fixed-length value. In one embodiment, a digest is implemented as a cryptographic hash function ("hash") taken over the sensitive data items $S_i$. A cryptographic hash function is denoted as the function h( ). In another embodiment, password $P_i$ is included as input of $f$, and a hash of the password, denoted as $h(P_i)$, is included in Π to enable efficient verification of $P_i$. In another embodiment, other data $t_i$ is also an input to $f$, and $f$ also outputs $h(t_i)$. In another embodiment in which other data $t_i$ is an input to function $f$, function $f$ outputs $t_i$. The sensitive data items $S_i=\{S_i^1, S_i^2, \ldots S_i^n\}$ are inputs to $f$, and password $P_i$ and other data $t_i$ are optional inputs to $f$. The output of the function $f$ is denoted as $f([P_i,] S_i [,t_i])$. The square brackets around an argument or arguments denote that the inclusion of that argument is optional.

Referring again to FIG. 1, in one embodiment, password changes to password $P_i$ are propagated by means of a file F 20, also referred to as a propagation file. The file F 20 can be transferred between systems in a variety of ways. These ways include, but are not limited to, a briefcase in MICROSOFT WINDOWS (an operating system manufactured by Microsoft Corporation of Redmond, Washington), a floppy, hard, or optical disk, a magnetic tape, a mutually accessible server, or a network connection. Moreover, although file F 20 is described for simplicity as consisting of a single file, this is only one embodiment. In other embodiments, file F 20 takes other forms, including, but not limited to, a number of files, one or more data structures in a memory, a directory entry, a database entry, or a buffered data stream.

Information in file F 20 may include, but is not limited to: passwords; system or user parameters; hashes of passwords or system or user parameters; cryptographic keys; executable code or scripts; and other types of sensitive and non-sensitive data. The file F 20 can be described as containing the output of a function g. In one embodiment, g takes as inputs current sensitive information $S_i$, past sensitive information $S_{i-1}$, and also (optionally) other information $t_i$ as inputs. This is denoted as g ($P_i$ [,$S_i$] [,$S_{i-1}$] [,$t_i$]), where the square brackets around an argument, as above, indicate optional inputs. In one embodiment, the function g outputs, and thus file F contains (1) $E_{pi}(S_{i-1}, S_i, [,t_i])$ where $E_{pi}$ denotes encryption under password $P_i$; (2) any salt, initialization vectors, or other parameters used for the encryption; and (3) a digest $D_i$ computed over the encrypted data, and possibly the password $P_i$. In one embodiment, digest $D_i$ is the output of a hash function that is used to verify the password. In other embodiments, other techniques known in the art are used to verify $P_i$, and file F does not contain a digest. In another embodiment, file F contains a value encrypted with password $P_i$, and a digest of the encrypted value.

Still referring to FIG. 1, in one embodiment, password information is propagated from System A 10 to System B 12 via file F 20. System B 12 receives a claimed password from the User 14. The claimed password is a password presented by the User in an authentication attempt, and is denoted by a prime symbol, as in P'. When it receives the claimed password, System B 12 verifies the password against the information in Π 20. If the password is not verifiable by the information in Π 20, the user may not have typed the correct password, or alternatively, the user may have changed her password on another system, for example on system A 10, and the user may now expect the password to be changed on system B 12. System B 12 attempts to verify the password using the information in file F 20. If such verification indicates that the user is in fact using her new password, then System B 12 synchronizes to the new password information, and stores the updated password information in Π 20.

In one embodiment, a change password module ("ChangePassword") creates an updated file F containing updated password information. A password synchronization module ("SyncPassword") actually updates data store Π using the updated file F. When the systems are synchronized, file F contains the output of function g($P_i$ [,$S_i$,] [,$S_{i-1}$] [,$t_i$]) and Π contains ƒ ([$P_i$,] $S_i$ [,$t_i$]). The ChangePassword module accepts as input the previous password $P_i$, a new password $P_{i+1}$, and the file F. ChangePassword updates the file F so that it contains information based on the new password $P_{i+1}$, that is g($P_{i+1}$, [$S_{i+1}$,] [$S_i$] [,$t_{i+1}$]). The SyncPassword module can be implemented on the same system as the ChangePassword module, and ChangePassword can be implemented on a different system that has access to File F.

In the embodiment of FIG. 1, for example, ChangePassword is implemented on System A 10 to create file F 20, and SyncPassword is implemented on System B 12 to update Π 18. SyncPassword receives as inputs the new password $P_{i+1}$ and the propagation file F. SyncPassword synchronizes Π so that it contains ƒ ([$P_{i+1}$,] $S_{i+1}$ [,$t_{i+1}$]). Although the password (P), the sensitive data (S), and possibly the additional data (t) are denoted as changed in the above description when ChangePassword and SyncPassword are run, this is not a limitation of the invention. For example, any of the following could be true in a particular instance: $P_{i+1}$ could equal $P_i$, $S_{i+1}$ could equal $S_i$, and $t_i$ could equal $t_{i+1}$.

Figure 2:
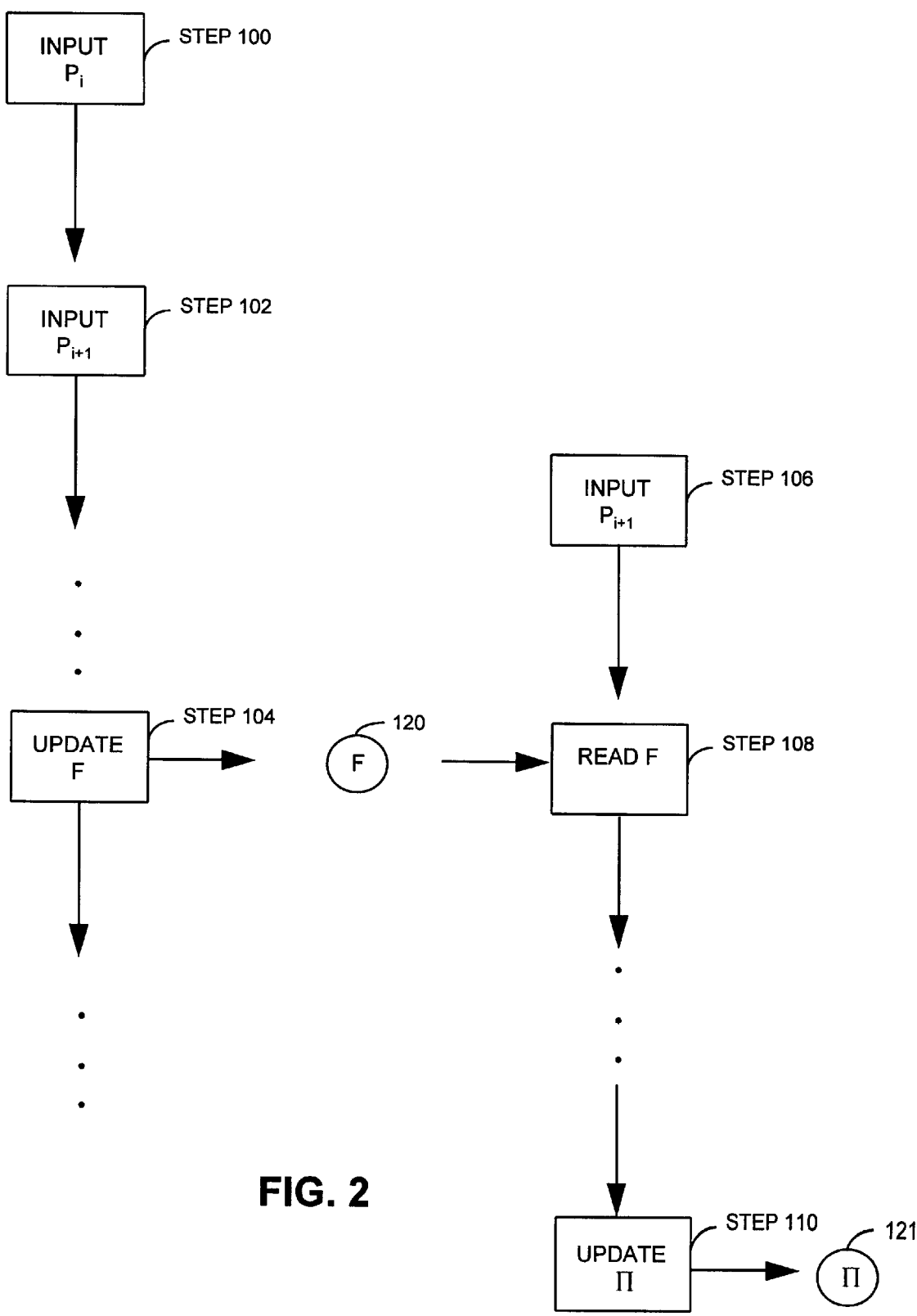
FIG. 2 is a block diagram of an embodiment of the invention.

Referring to FIG. 2, in one embodiment, the ChangePassword module accepts as input from the user or another source, the claimed password $P_i'$ (STEP 100). Accepting the claimed password provides security against unauthorized password modification, since initiation of a password modification by means of ChangePassword requires knowledge of the current password. The ChangePassword module then decrypts, using claimed password $P_i'$, any data in F which is encrypted under password $P_i$. ChangePassword module then verifies the correctness of claimed password $P_i'$ (using, for example, a digest $D_i$ contained in file F). If the verification fails, ChangePassword aborts. If the verification is successful, Change Password accepts the new password $P_{i+1}$ (STEP 102). The ChangePassword module updates file F 120 so that it contains g($P_{i+1}$, [$s_i$] $s_{i+1}$ [,$t_{i+1}$]) where the new sensitive data $S_{i+1}$ are determined in an appropriate fashion, generally with reference to $s_i$, and possibly through the generation of random data (STEP 104).

Upon completion of ChangePassword, the file F 120 contains g($P_{i+1}$, [$s_i$,] [$s_{i+1}$,] [,$t_{i+1}$,]). At this point, however, Π 121 still contains ƒ([$P_i$,] $s_i$ [,$t_i$]). Since the user has just changed her password to $P_{i+1}$, the information in Π 121 is outdated. Therefore, if in the scenario described above in which the user changes her password on System A but not System B, when System B next attempts to verify the users claimed password $P_{i+1}$, the password verification procedure making use of the information in Π fails. This event can result in the invocation of SyncPassword, which can operate as follows.

In one embodiment, SyncPassword accepts as input from the user or another source $P_{i+1}'$, the claimed password $P_{i+1}$ (STEP 106). SyncPassword decrypts, using password $P_{i+1}'$, any data in F which is encrypted under password $P_{i+1}$ (STEP 108). SyncPassword verifies that Π 121 is correct by means of data contained in F 120. For example, in one embodiment, SyncPassword decrypts the old password $P_i$. If the verification fails, SyncPassword aborts. SyncPassword changes any relevant state information in F. SyncPassword updates Π so that it contains ƒ([$P_{i+1}$,]$s_{i+1}$ [,$t_{i+1}$]) (STEP 110). After execution of SyncPassword, Π is synchronized to file F, so that F contains g($P_{i+1}$, [$s_i$] [$s_{i+1}$,] [,$t_{i+1}$]), and Π contains ƒ[$P_{i+1}$] $s_{i+1}$ [,$t_{i+1}$]).

The following discussion of the figures presents specific embodiments of the invention. In some embodiments, hashes and encryptions may be salted, which is the inclusion of extra data along with data to be hashed or encrypted, to enhance the security of the invention. To simplify explanation, the description does not explicitly indicate where this salting should occur. Those skilled in the art will recognize where such salting would be appropriate. Also, appropriate initialization of Hj and of the propagation file F is assumed. In one embodiment, Π contains a digest $h(P_0)$ for some specified initial password $P_0$, and the propagation of file F is also be formed with reference to $P_0$.

Figure 3A:
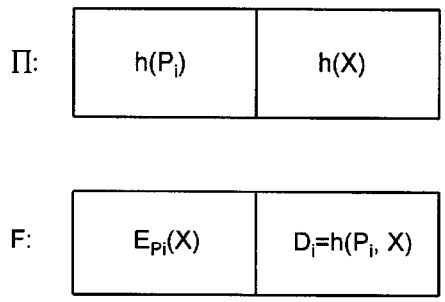
FIG. 3A is a block diagram of an embodiment of a data store and a file in one embodiment of the invention.

Referring to FIG. 3A, in one embodiment, when F and Π are synchronized, file F contains a random value X encrypted with the password $P_i$, denoted as $E_{pi}(X)$. X is a fixed, random value and is of a suitably large bit length, for example, 128 bits or more. File F also contains a digest of the password and X, denoted $D_i=h(P_i,X)$. As shown in FIG. 3, Π contains the hash of the password, denoted as $h(P_i)$, and Π also contains the hash of X, denoted $h(X)$.

Figure 4:
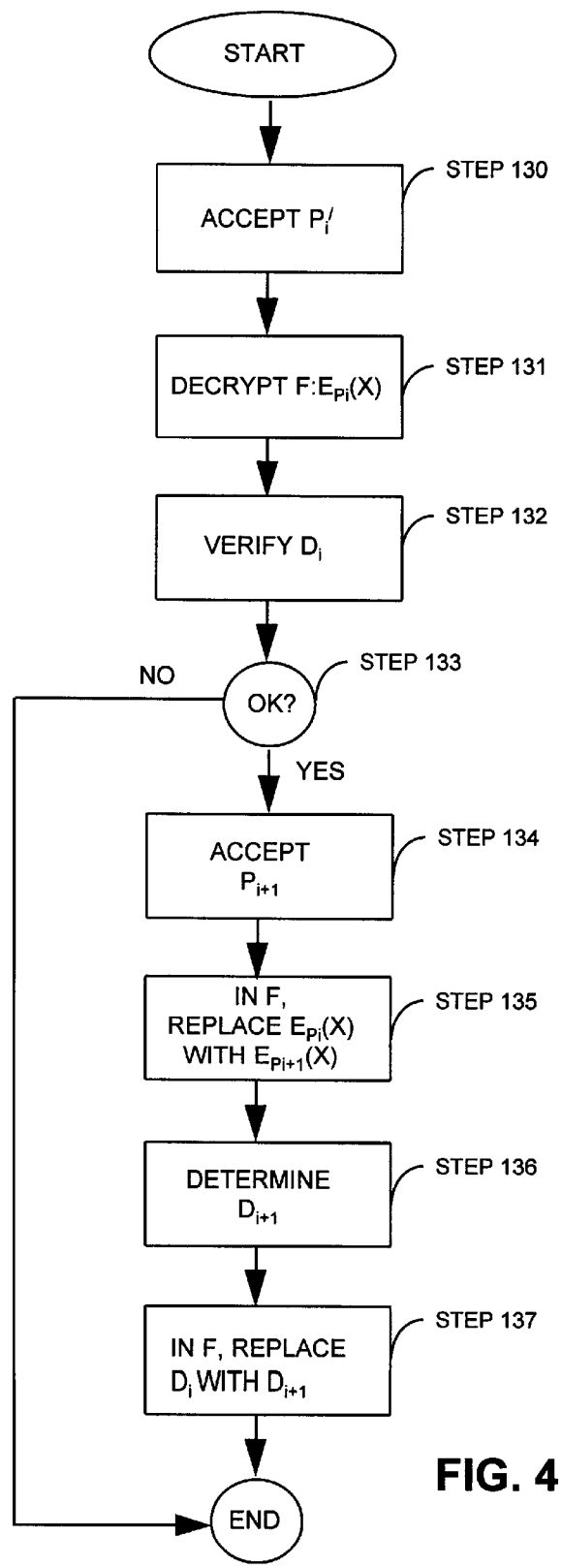
FIG. 4 is a flowchart of one embodiment of the password change module for the embodiments of FIG. 3A and FIG. 3B.

Referring to FIG. 4, in this embodiment, ChangePassword accepts a claimed password $P_i'$ (STEP 130), and uses the claimed password to decrypt the material in F (STEP 131). If the claimed password $P_i'$ is the same as the actual password $P_i$, then $E_{pi}(X)$ can be decrypted to determine random value X. ChangePassword verifies that the digest $D_i$ that is stored in F is the hash of the password and the random value X (STEP 132). If the hash of the password $P_i$ and random value X that is determined by ChangePassword using the claimed password $P_i'$ matches the hash in F, then the password $P_i$ is correct (STEP 133). If the password is not correct, the module aborts (STEP 133). Once password $P_i$ is verified, ChangePassword accepts a new password $P_{i+1}$ (STEP 134). F is then updated so that $E_{pi}(X)$ is replaced by $E_{pi+1}(X)$ (STEP 135). The digest $D_{i+1}$ is determined by hashing the new password $P_{i+1}$ and random value X (STEP 136). The digest $D_i$ in file F is replaced by the new digest $D_{i+1}$ (STEP 137).

Figure 5:
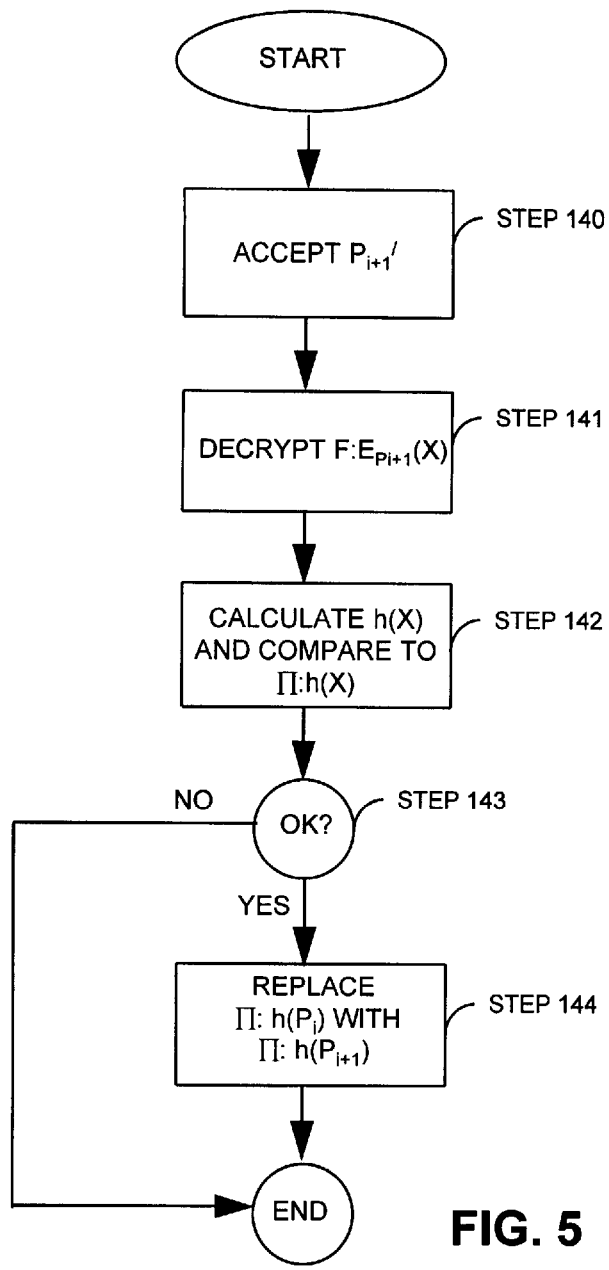
FIG. 5 is a flowchart of one embodiment of the password synchronization module for the embodiments of FIG. 3A and FIG. 3B.

Referring to FIG. 5, in this embodiment, SyncPassword accepts a claimed password $P_{i+1}'$ (STEP 140). SyncPassword uses the claimed password $P_{i+1}'$ to decrypt the information in file F. Specifically, SyncPassword decrypts $E_{pi+1}(X)$ to determine the random value X that was encrypted with the new password $P_{i+1}$ (STEP 141). SyncPassword then verifies that Π is correctly formed given the data in F by determining the hash of random value X, $h(X)$, and comparing the determined value to the $h(X)$ stored in Π (STEP 142). If the hashes match (STEP 143), 11 is updated by replacing $h(P_i)$ with $h(P_{i+1})$ (STEP 144).

Figure 3B:
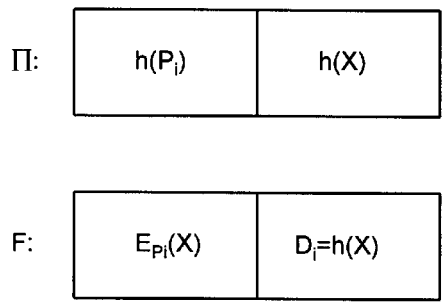
FIG. 3B is a block diagram of another embodiment of the data store and a file.

Referring to FIG. 3B, in an embodiment similar to that shown in FIG. 3A, the digest $D_i$ in file F contains the hash of the random value X, but not the password $P_i$. This variation has the advantage of making the digest simple to determine, with the tradeoff of making the digest slightly more vulnerable to a brute force attack. In this embodiment, the ChangePassword and SyncPassword modules operate in essentially the same manner as in the previous embodiment. The primary difference is that in digest creation and verification steps, the password is not hashed.

The embodiments just described have the advantage of being simple, but are less secure than the embodiments described below. In the embodiments just described, if an attacker obtains access to file F, she may determine $P_i$, and thereby decrypt X. By re-encrypting X at any later time with a new password of her choice, the attacker may make an authorized password modification. Thus this embodiment of the invention lacks what is known as forward secrecy, because a breach at any one time renders the system open to attacks at any time in the future.

Figure 6:
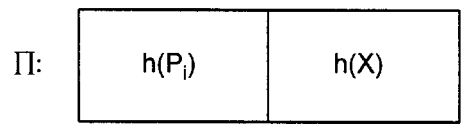
FIG. 6 is a block diagram of another embodiment of a data store and file.
Figure 6:
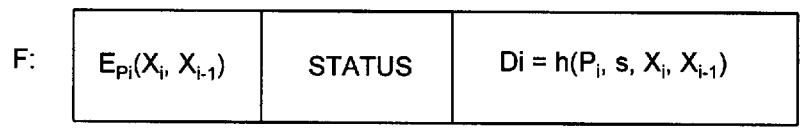

Referring to FIG. 6, in another embodiment, when F and Π are synchronized, F contains random bitstrings $X_i$ and $X_{i-1}$, which are encrypted with the current password, denoted $E_{pi}(X_i, X_{i-1})$. F also contains a status indicator, which may be implemented as a bit, or a word of any length, or other boolean value indicator. The status indicator indicates whether F and Π are synchronized, and has two possible states: IN_SYNC (synchronized) and NO_SYNC (not synchronized). In one embodiment, IN_SYNC is represented by a 0 bit, and NO_SYNC is represented by a 1 bit. In another embodiment, IN_SYNC is represented by a 1 bit and NO_SYNC is represented by a 0 bit. Other embodiments can represent IN_SYNC and NO_SYNC in other ways that are particular to the implementation of the status indicator without departing from the spirit of the invention. File F also contains a digest that is a hash of the password, the status value, and the random bitstrings $X_i$ and $X_{i-1}$, denoted $D_i=h(P_i,s,X_i,X_{i-1})$. Data store Π contains the hash of the current password $h(P_i)$ and the hash of the current random value $X_i$, denoted $h(X_i)$.

Figure 7:
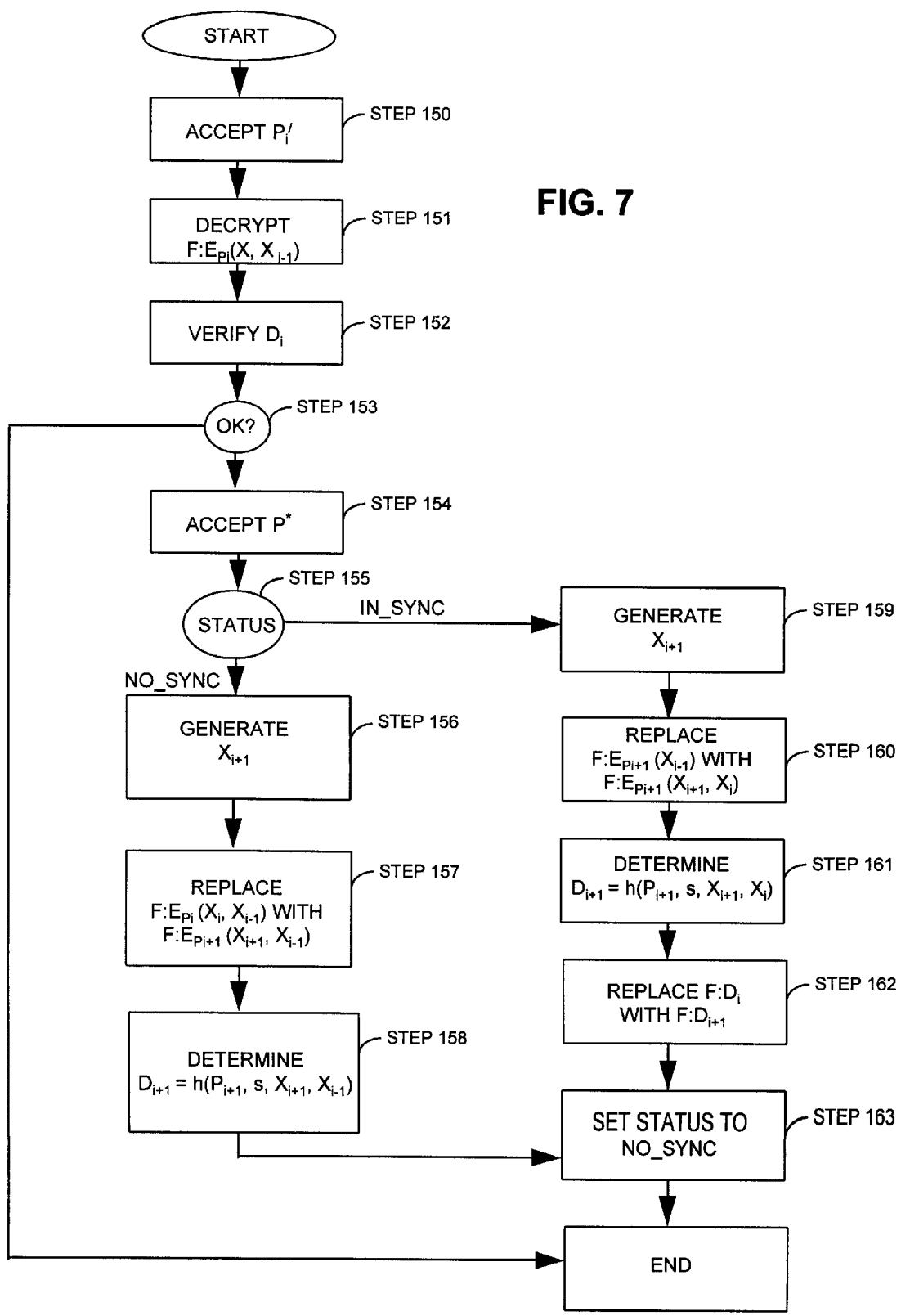
FIG. 7 is a flowchart of an embodiment of the password change module for the embodiment of FIG. 6.

Referring to FIG. 7, in this embodiment, ChangePassword accepts a claimed current password $P_i'$ (STEP 150). The information in the current file F, including the random values $X_i$ and $X_{i-1}$ are decrypted using the claimed password $P_i'$. Change password determines the digest of $P_i$, s, $X_i$, and $X_{i-1}$, and compares it to the digest $D_i$ that is stored in file F (STEP 152). If the digests match, the claimed password $P_i'$ is deemed acceptable, and a new password $P_{i+1}$ is accepted (STEP 154). The status indicator determines what happens next (STEP 155).

If the status indicator indicates that F and Π are currently synchronized, then P* represents a new password $P_{i+1}$. A new random bitstring $X_{i+1}$ is generated (STEP 159). In file F, $E_{pi}(X_i, X_{i-1})$ is replaced with $E_{pi+1}(X_{i+1}, X_i)$, with $P_{i+1}$=P* (STEP 160). A new digest $D_{i+1}$ is determined by hashing $P_{i+1}$, s, $X_{i+1}$, and $X_i$ (STEP 161). Digest $D_i$ is replaced by new digest $D_{i+1}$ (STEP 162). Finally, the status indicator is set to indicate that F and Π are not synchronized (STEP 163). As described above, depending on the specific implementation of the status indicator, this may require setting a bit, clearing a bit, or setting or clearing multiple bits, and/or one or more words.

If the status indicator indicates that F and Π are not synchronized, file F has previously been updated using some password $P_{i+1}$. In this case, ChangePassword updates F by allowing the new password P* to supersede $P_{i+1}$. In other words, P* (the new $P_{i+1}$) replaces the previous $P_{i+1}$ in F. Other arguments, such as $D_{i+1}$, may be modified as well in this case, but $X_i$ is left unchanged. Use of the status bit thus ensures that $X_i$ is appropriately retained in file F.

Specifically, a new random bitstring $X_{i+1}$ is generated (STEP 156). In file F, $E_{pi}(X_i, X_{i-1})$ is replaced with $E_{pi+1}(X_{i+1}, X_{i-1})$ (STEP 157). The old random value, $X_{i-1}$, is retained rather than replaced. A new digest $D_{i+1}$ is determined by hashing $P_{i+1}$, s, $X_{i+1}$, and $X_{i-1}$ (STEP 158). Digest $D_i$ is replaced by new digest $D_{i+1}$ (STEP 162). Finally, the status indicator continues to indicate that F and Π are not synchronized (STEP 163).

Figure 8:
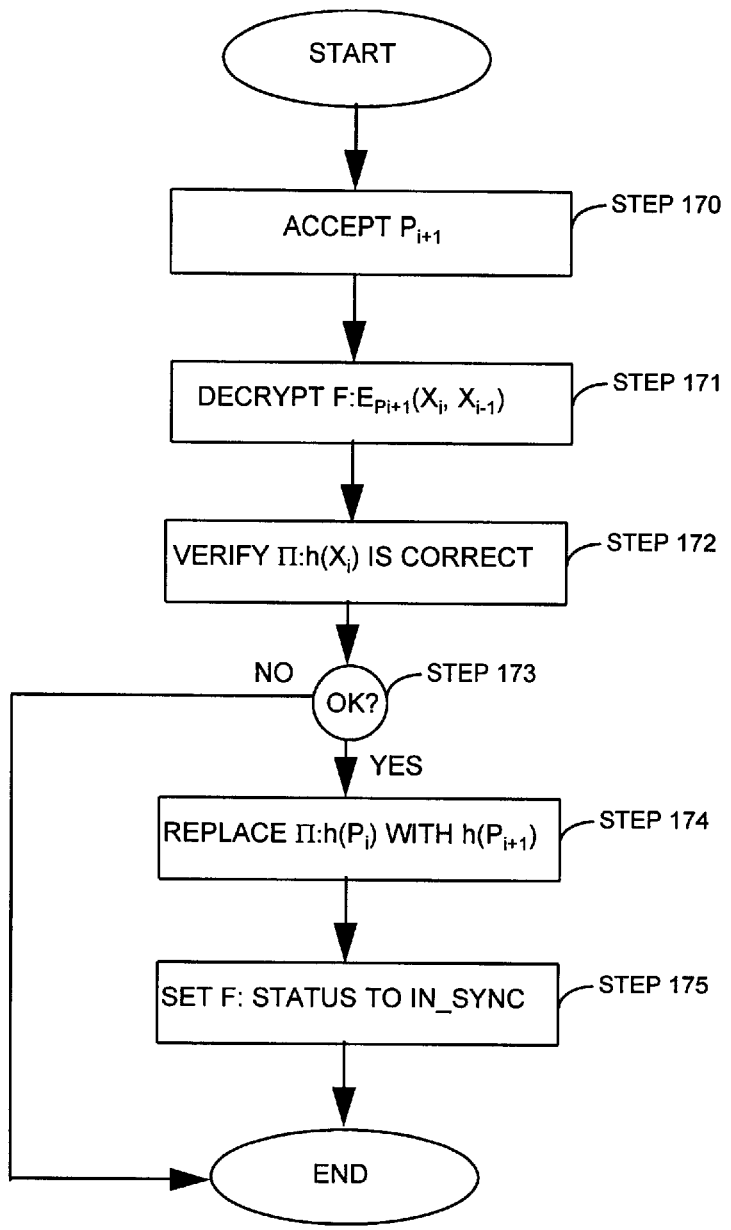
FIG. 8 is a flowchart of an embodiment of the password synchronization module for the embodiment of FIG. 6.

Referring to FIG. 8, in this embodiment SyncPassword accepts the claimed password $P_{i+1}'$ (STEP 170), and decrypts the encrypted information in F (STEP 171), which in this case includes the previous random value $X_i$ and the new random value $X_{i+1}$. SyncPassword verifies that Π is correctly formed given file F (STEP 172), so that $h(X_i)$ is correctly formed given the value of $X_i$ extracted from F. If the hashes match (STEP 173), data store H is updated so that $h(P_i)$ is replaced by $h(P_{i+1})$, and $h(X_i)$ is replaced by $h(X_{i+1})$ (STEP 174). SyncPassword then modifies F by setting the status indicator as appropriate to indicate that F and Π are now synchronized (STEP 175).

Thus, in this embodiment, ChangePassword may be executed several times, but $X_{i+1}$ is replaced with $X_i$ only during the first such execution of ChangePassword. Moreover, only the last P* is used by SyncPassword. Since both $P_i$ and $X_i$ are modified in this embodiment of the invention, this embodiment is more secure than the first embodiment, in that it offers forward secrecy. The present embodiment, however, is more complex than the first embodiment, due to the use of the status bit s and the varying $X_i$.

The disclosed embodiment also requires a random or pseudorandom value generator to generate the random value X. In one embodiment, the random source is a physical random value source. This could be costly to add to a system, but could work well in a system that already included a physical random value generator for other purposes. In another embodiment, a pseudorandom value generator is used. To produce a value that is sufficiently random that it could not be predicted, a pseudorandom number generator generally requires the secure storage of one or more "seed" values. These values may be stored in many place, and for example could be stored in file F, but if the seed is revealed, the forward secrecy benefits of the disclosed embodiment may not be fully realized.

The disclosed embodiment also requires that SyncPassword modify file F. In an embodiment in which system A and system B are separate computer systems, the systems need to share file F. This can complicate the password synchronization, unless such file sharing functionality is already part of the system. This file sharing can be accomplished in many ways known in the art. For example, in one embodiment, file F is sent from system A to system B, and back again to system A when it has been modified. In another embodiment, file F is a common file accessible to both systems.

Figure 9:
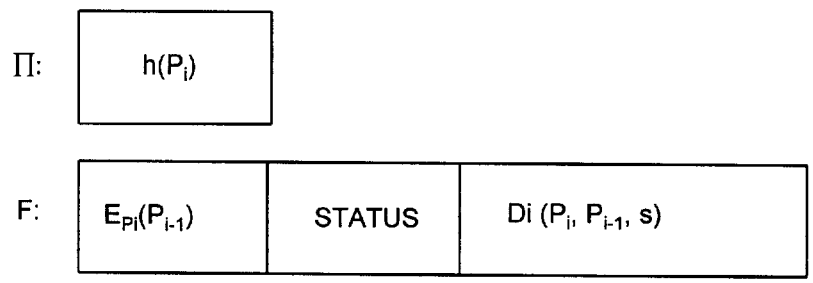
FIG. 9 is a block diagram of another embodiment of a data store and file.

Referring to FIG. 9, in another embodiment file F contains the previous password that has been encrypted with the current password, denoted $E_{pi}(P_{i-1})$. File F also contains a status bit s, and file F contains a digest that is the hash of the current password, the previous password, and the status bit. Data store Π contains the hash of the current password $h(P_i)$.

Figure 10:
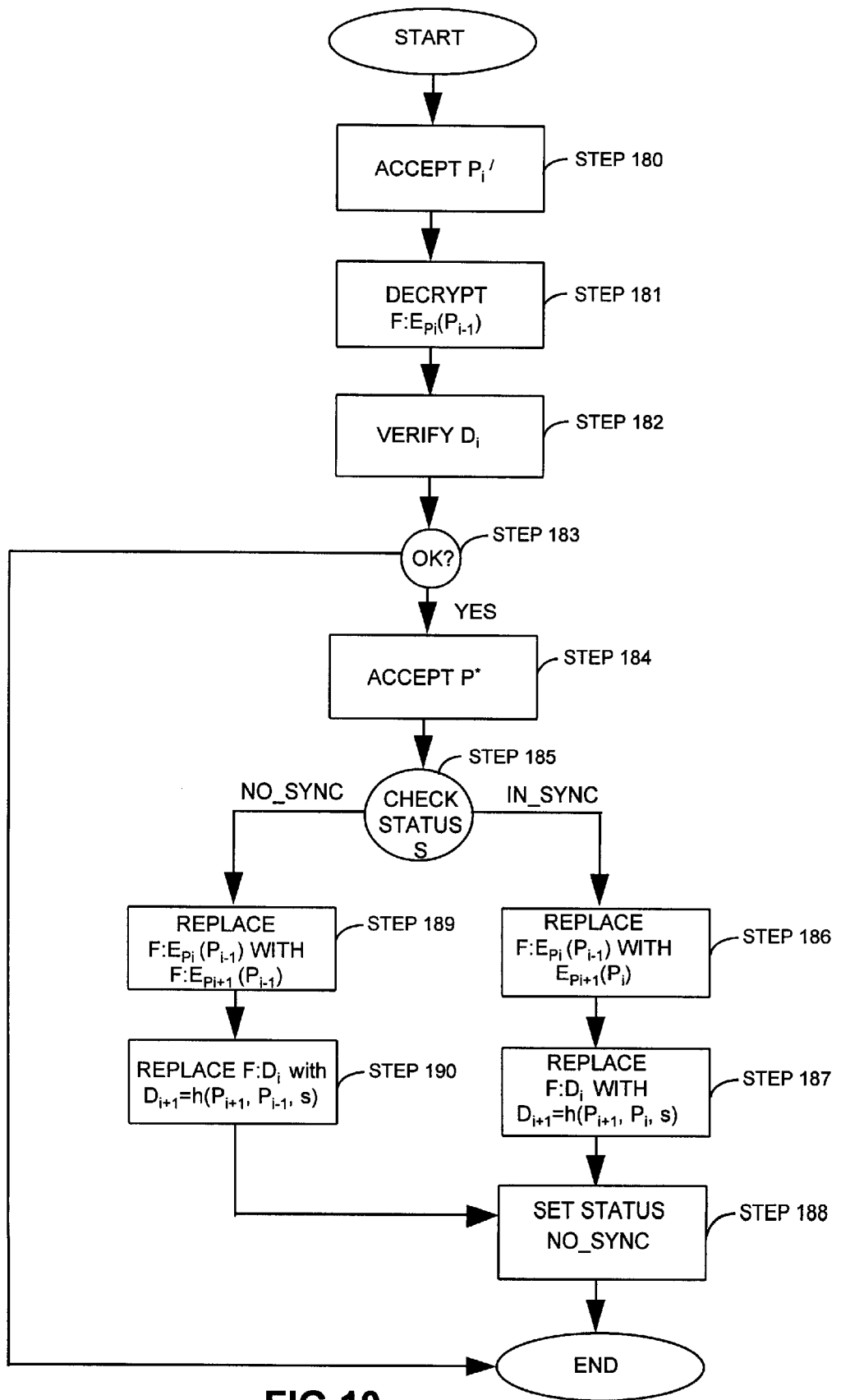
FIG. 10 is a flowchart of an embodiment of the password change module for the embodiment of FIG. 9.

Referring to FIG. 10, in this embodiment, ChangePassword accepts a claimed password $P_i'$ (STEP 180). ChangePassword uses the claimed password $P_i'$ to decrypt the information in the current file F (STEP 181), which in this case is the previous password $P_{i-1}$. ChangePassword can then verify the digest $D_i$ by hashing $P_i$, $P_{i-}$, and s, and comparing the result to the digest contained in file F (STEP 182). If the verification is successful (STEP 183), ChangePassword accepts a new password P* (STEP 184). The next steps are determined by the status indicator (STEP 185).

If F and Π are currently synchronized, then password P' represents an old password $P_i$, while P* represents a new password $P_{i+1}$. ChangePassword therefore replaces $E_{pi}(P_{i-1})$ with $E_{pi+1}(P_i)$, with $P_{i+1}=P^*$ (STEP 186). The digest $D_{i+1}$ is determined by hashing $P_{i+1}$. $P_i$. and s, and $D_i$ is replaced by $D_{i+1}$ (STEP 187). Finally, the status indicator in file F is set appropriately to indicate that F and Π are not synchronized (STEP 188).

If ChangePassword determines that F and Π are not synchronized, this indicates that F has already been updated using some password $P_{i+1}$. In this case, ChangePassword updates F by allowing the password P* to supersede $P_{i+1}$. In other words, P* (the new $P_{i+1}$) replaces the previous $P_{i+1}$ in file F. Other arguments, such as $D_{i+1}$, may additionally be changed, but $P_i$ remains unchanged. Use of the status indicator thus ensures that $P_i$ is appropriately retained in file F. Specifically, $E_{pi}(P_{i-1})$ is replaced with $E_{pi+1}(P_{1-1})$, with $P_{i+1}=P^*$ (STEP 189). The digest $D_{i+1}$ is determined by hashing $P_{i+1 \cdot Pi-1}$ and s, and $D_i$ is replaced by $D_{i+1}$ (STEP 190). Finally, the status indicator in file F is maintained appropriately to indicate that file F and data store Π still are not synchronized (STEP 188).

Figure 11:
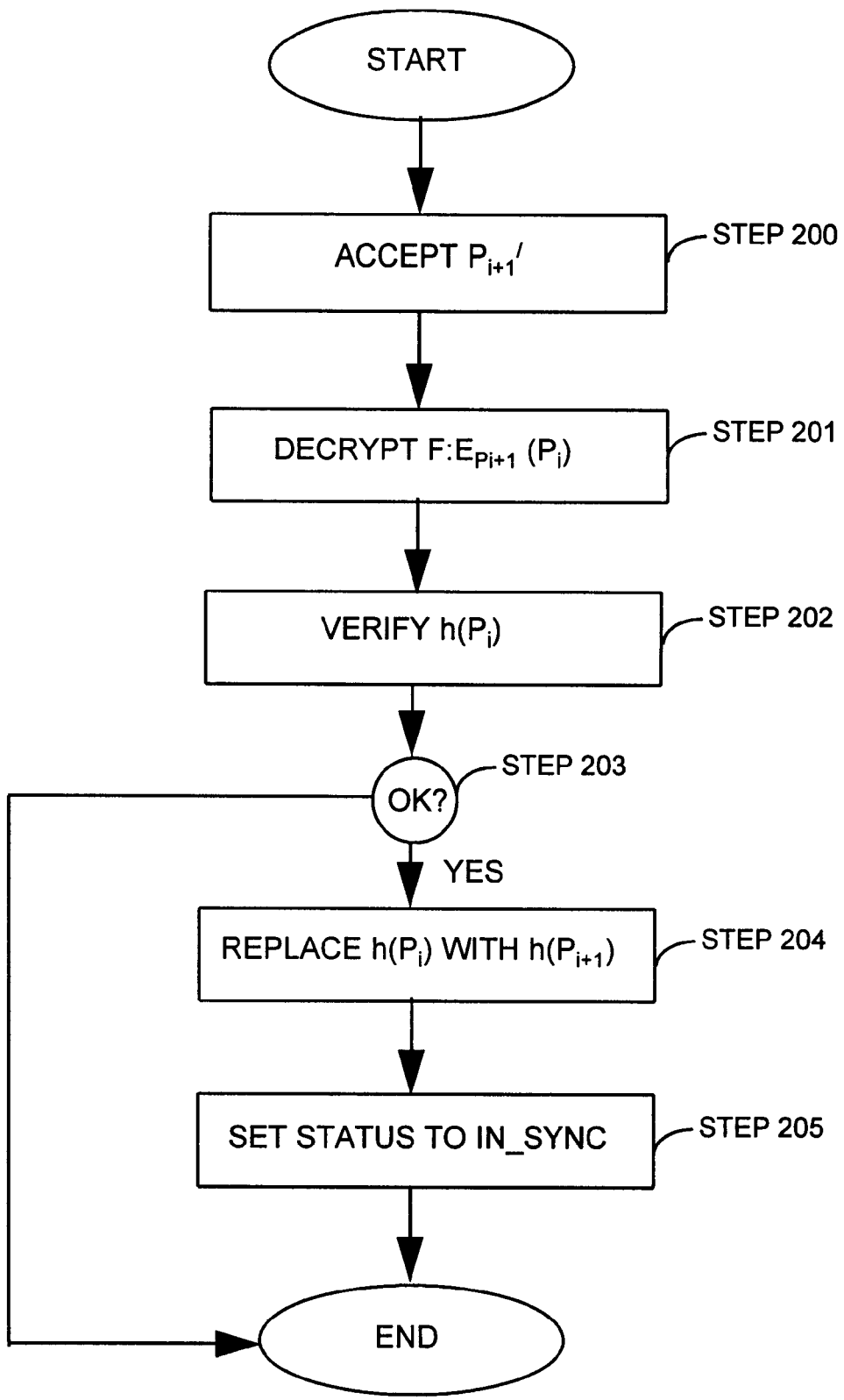
FIG. 11 is a flowchart of an embodiment of the password synchronization module for the embodiment of FIG. 9.

Referring to FIG. 11, in this embodiment SyncPassword accepts a password $P_{i+1}'$ (STEP 200), decrypts the information in F, which in this case is the previous password $P_i$ encrypted with the new password $P_{i+1}$ (STEP 201), and verifies that Π is correctly formed given F, by comparing the hash of the previous password with the hash $h(P_i)$ that is stored in Π (STEP 202). If the information in Π is correctly formed (STEP 203), SyncPassword replaces $h(P_i)$ with $h(P_{i+1})$ in Π (STEP 204). SyncPassword then modifies F by setting the status indicator to indicate that F and Π are now synchronized. This embodiment of the invention, like the second embodiment, offers forward secrecy, and is thus more secure than the first embodiment of the invention. This embodiment may be less secure than the second embodiment because the file F contains less entropy. It has the advantage of not requiring a random or pseudorandom number generator.

Most users choose to make use of passwords containing a preponderance of alphanumeric characters. An attacker who captures the file F in the foregoing preferred embodiment of the invention may mount an attack of the following form. Suppose that F has been updating using password $P_{i+1}$. The attacker repeatedly guesses possible password $P_{i+1}$, and attempts to decrypt $E_{pi+1}(P_i)$. If the decryption yields a preponderance of alphanumeric characters, then the attacker presumes that she has recovered $P_i$ successfully.

This variety of attack may be hindered by changing the form of the file F. Instead of placing the encryption $E_{pi+1}(P_i)$ in F, it is possible to place in F the argument $E_{pi+1}(E_y(P_i))$, where Y is a piece of data stored in Π. In one embodiment of this enhancement, for instance, Y might be the argument $h(P_i)$. In this case, F might contain, for instance, $E_{pi+1}(P_i \oplus (h(P_i) \| h(h(P_i)) \| \ldots))$. (Here, the symbol $\oplus$ denotes the XOR operation, $\|$ denotes concatenation, and the ellipsis indicates appropriate addition or removal of arguments in a manner evident to those skilled in the art.) When this enhancement or any variation thereof is deployed, an attacker is unable to use the attack described above without having read access to ∪. On the other hand, it will be evident to those skilled in the art that after the inclusion of this enhancement, elementary modifications to the algorithms ChangePassword and SyncPassword yield a scheme substantially similar to the unenhanced preferred embodiment 3.

While the invention has been described above with respect to the above embodiments those skilled in the art will appreciate that these embodiments are only illustrative of the invention and the teachings of the invention may be practiced in a variety of ways. There are implementations, in addition to those described above, in which two or more systems that are physically or logically separated could successfully incorporate password syncronization. For example, synchronization of passwords between an individual's various computers (i.e., office, home, laptop, etc.), or to synchronize passwords, keys, or other material between two related computers (i.e., computers of the same individual, on the same system, etc.) presents a similar model.

As one particular example, personal computing devices can be secured with what is referred to as a boot password, that is, a password whose correct entry is required before the system software is loaded. In such personal computing devices, information such as data and executable code that is required to verify the boot password can be stored in a specially designated storage location, referred to as a "protected" location, on a system storage device. This information can include the password, and also can include other information relating to the user. The information can include code to be executed to verify the password. The information can include random numbers and salts that are used to render the useful information more difficult for an attacker to decrypt. The information can be encrypted using the password, and/or the information may include a hash or digest of the password and/or the other information in the protected location. Any or all of this information may be included in the protected location.

In some computing devices, the protected location is write-accessible during the boot sequence of the computing device, but is not write or read-accessible during the normal operation of the computing device. This write and read protection may be implemented in hardware or software. The protected storage location therefore defines two possible computing device states: a first state, referred to as the "boot" state, in which the protected storage location is accessible, and a second state, referred to as the "normal operation" state, in which the protected storage location is not accessible.

In systems that have such a protected storage location, a user request to change the information stored in the protected location, for example the boot password, cannot cause the protected location to be modified during normal operation. Rather, the change must be stored somewhere else, and then stored in the protected location at a later time, for example upon the next instantiation of the boot sequence. As described above, such changes of the boot password can be propagated in a secure manner.

This model of two systems, system A and system B, as described above, can include a first system active during the boot sequence, and a second system active during the normal operation of the computing device, with only the first system having write and/or read access to the protected locations. The present invention, as described herein, can accomplish password synchronization in a restricted setting in which system A and system B are not physically separate systems, but rather distinct states offering different access rights on a single system.

In one embodiment, a computing system alternates between at least two states, designated state A and state B. In state A, the system has write access to a piece of protected memory storage, which can be, as described above, data store Π. In state B, the system cannot make modification to Π, but it is possible that in state B a user may nevertheless wish to update the password by which access to certain operations is granted in state A. In one embodiment, state A is the boot sequence of a computer and state B is the normal operation period, and the password enables the transition from state A to state B. To limit the abilities of an unauthorized user, Π cannot be modified during the normal operation period, so information necessary to verify a new password cannot be written to Π directly, and rather must be propagated. Although the user could avoid the propagation by updating the password directly in state A, it may be more convenient to update the password in state B, since the same password may have additional purposes in state B, and perhaps since more friendly software tools may be available for updating passwords in that state.

Other variations, modifications, and implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A data structure facilitating synchronization of passwords between two or more systems, the data structure stored in a memory element, the data structure comprising:
   (a) a first portion storing a value encrypted with an encryption key based on the password; and
   (b) a second portion storing a digest created in response to an input comprising the value.

2. The data structure of claim 1 wherein the digest is created in response to the value.

3. The data structure of claim 2 wherein the digest is created by hashing the value.

4. The data structure of claim 1 wherein the digest is created in response to the value and other information.

5. The data structure of claim 4 wherein the digest is created by hashing the value and other information.

6. The data structure of claim 1 wherein the digest is created in response to the value and the password.

7. The data structure of claim 2 wherein the digest is created by hashing the value and the password.

8. The data structure of claim 1 wherein the first portion stores a value encrypted with an encryption key comprising the password.

9. The data structure of claim 1, further comprising:
   (c) a third portion storing a status indicator for indicating whether the value and the digest are synchronized with data in a data store.

10. A method for creating a password file, comprising the steps of:
    (a) encrypting a value using an encryption key based on an updated password;
    (b) creating a digest in response to the encrypted value; and
    (c) storing in a memory the value and the digest.

11. The method of claim 10 wherein the encrypting step comprises encrypting a value using an encryption key comprising the password.

12. The method of claim 10 wherein step (b) comprises hashing the value.

13. The method of claim 10 comprising storing in a memory the value, the digest, and a synchronization status indicator.

14. A method for changing a password, comprising the steps of:
    (a) accepting a first password;
    (b) decrypting information in a file that was encrypted with the first password;
    (c) verifying the decrypted information;
    (d) accepting a second password; and
    (e) encrypting information in the file with the second password.

15. The method of claim 14 further comprising:
    (f) receiving a claimed second password;
    (g) decrypting information in a password update file using the received claimed second password;
    (h) verifying the received claimed second password by comparing the decrypted information to the data in the password verification memory location; and
    (i) replacing at least some of the data in the password verification memory location in response to the received claimed second password.

16. The method of claim 14 further comprising:
(f) hashing the information in the file that was encrypted with the first password; and
(g) storing the hash result in the file.

17. The method of claim 16 further comprising:
(h) receiving a claimed second password;
(i) decrypting information in a password update file using the received claimed second password;
(j) verifying the received claimed second password by comparing the decrypted information to the hash result in the file; and
(k) replacing at least some of the data in the password verification memory location in response to the received claimed second password.

18. The method of claim 14, wherein step (b) comprises decrypting a random value that was encrypted with the first password and step (a) comprises encrypting a random value with the second password.

19. The method of claim 18, further comprising the steps of:
(e) creating a digest comprising the has of the random value; and
(f) storing the digest in the file.

20. The method of claim 18, further comprising the steps of:
(e) creating a digest comprising hash of the second password and the random value; and
(f) storing the digest in the file.

21. The method of claim 14, wherein step (b) comprises decrypting a current random value and a previous random value that were encrypted with the first password, and step (d) comprises encrypting a current random value and a previous random value with the second password.

22. The method of claim 21 further comprising the steps of:
(e) creating a digest comprising a hash of the second password, a status indicator, the current random value and the previous random value; and
(f) storing the digest in the file.

23. The method of claim 14, wherein step (b) comprises decrypting a prior password encrypted with the first password, and step (d) comprises encrypting the first password with the second password.

24. The method of claim 23, further comprising the steps of:
(e) creating a digest comprising a hash of the first password, the second password, and a status indicator; and
(f) storing the digest in the file.

25. The method of claim 14 wherein step (b) comprises decrypting a random value in the password update file using the received password; and step (c) comprises comparing a hash of the random value to the data in the password verification memory location.

26. The method of claim 14 wherein step (b) comprises decrypting a current random value and a previous random value in the password update file using the received password.

27. The method of claim 14 wherein step (b) comprises decrypting a prior password in the password update file using the received password.

28. A system for changing a password, comprising:
(a) a first receiver for receiving a first password;
(b) a decrypting module for decrypting information in a file that was encrypted with the first password;
(c) a verify module for verifying the decrypted information;
(d) a second receiver for receiving a second password; and
(e) an encrypting module for encrypting information in the file with the second password.

29. A system for updating data in a password verification memory, comprising:
(a) a password update file;
(b) a receiver for receiving a password;
(c) a decryption module for decrypting information in the password update file;
(d) a verification module for verifying the received password by comparing the decrypted information to the data in the password verification memory; and
(e) an output for replacing at least some of the data in the password verification memory in response to the received password.

30. A method for updating a password, comprising the steps of:
(a) receiving password data;
(b) decrypting a value using a decryption key based on the password data;
(c) producing a first function result in response to the decrypted value;
(d) comparing the first function result with a value in a memory to verify the password data;
(e) producing a second function result in response to the password data; and
(f) storing the second function result in the memory.

31. The method of claim 30, wherein step (b) comprises decrypting a value in an update file that was encrypted with an updated password; and step (e) comprises producing a second function result by determining a hash of the updated password.

32. The method of claim 30, wherein step (b) comprises decrypting a value in an update file that includes a current random value and a previous random value encrypted with an updated password; step (d) comprises comparing a hash of the previous random value with a value in memory; and step (e) comprises producing a second function result by determining a hash of the updated password.

33. The method of claim 30, wherein step (b) comprises decrypting a prior password in an update file that was encrypted with an updated password; step (d) comprises comparing a hash of the previous password with a value in memory; and step (e) comprises producing a second function result by determining a hash of the updated password.

34. A password update system, comprising:
a receiver for receiving a password;
a decryption module for decrypting a value using a decryption key based on the password;
a first hashing module for hashing the decrypted value;
a verifier for comparing the hash of the decrypted value with a value in a memory to verify the password; and
a second hashing module for hashing the password and storing the result in the memory.

35. A method for updating data in a password verification memory location, comprising the steps of:
(a) receiving a password;
(b) decrypting information in a password update file using the received password;

(c) verifying the received password by comparing the decrypted information to the data in the password verification memory location; and (d) replacing at least some of the data in the password verification memory location in response to the received password.

36. A system for updating data, comprising:

(a) a password verification memory location;

(b) a password update file;

(b) a receiver for receiving a password;

(c) a decryption module for decrypting information in the password update file using the received password;

(c) a verifier for verifying the received password by comparing the decrypted information to the data in the password verification memory location; and (d) an output for replacing at least some of the data in the password verification memory location in response to the received password.

* * * * *

UNITED STATES PATENT AND TRADEMARK OFFICE
CERTIFICATE OF CORRECTION

PATENT NO. : 6,240,184 B1
DATED : May 29, 2001
INVENTOR(S) : Huynh et al.

Page 1 of 1

It is certified that error appears in the above-identified patent and that said Letters Patent is hereby corrected as shown below:

Column 13,
Line 17, delete "(a)", insert -- (e) --.
Line 21, delete "(e)", insert -- (f) --.
Line 21, delete "has", insert -- hash --.
Line 23, delete "(f)", insert -- (g) --.
Line 26, delete "(e)", insert -- (f) --.
Line 26, delete "hash", insert -- a hash --.
Line 27, delete "(f)", insert -- (g) --.
Line 31, delete "(d)", insert -- (e) --.
Line 35, delete "(e)", insert -- (f) --.
Line 38, delete "(f)", insert -- (g) --.
Line 41, delete "(d)", insert -- (e) --.
Line 46, delete "(e)", insert -- (f) --.
Line 49, delete "(f)", insert -- (g) --.

Column 15,
Line 10, delete "(b) a receiver", insert -- (c) a receiver --.

Column 16,
Line 1, delete "(c)", insert -- (d) --.
Line 3, delete "(c)", insert -- (e) --.
Line 6, delete "(d)", insert -- (f) --.

Signed and Sealed this

Thirtieth Day of April, 2002

Attest:

Attesting Officer

JAMES E. ROGAN
*Director of the United States Patent and Trademark Office*